(12) United States Patent
Hetland

(10) Patent No.: US 8,597,029 B2
(45) Date of Patent: Dec. 3, 2013

(54) PULSE SIMULATION UNIT

(75) Inventor: Eirik Hetland, Stavanger (NO)

(73) Assignee: Laerdal Medical AS, Stavanger (NO)

( * ) Notice: Subject to any disclaimer, the term of this patent is extended or adjusted under 35 U.S.C. 154(b) by 0 days.

(21) Appl. No.: 13/509,563

(22) PCT Filed: Nov. 11, 2010

(86) PCT No.: PCT/EP2010/067294
§ 371 (c)(1),
(2), (4) Date: Sep. 6, 2012

(87) PCT Pub. No.: WO2011/058103
PCT Pub. Date: May 19, 2011

(65) Prior Publication Data
US 2013/0177889 A1    Jul. 11, 2013

(30) Foreign Application Priority Data
Nov. 12, 2009 (NO) .................................. 20093322

(51) Int. Cl.
*G09B 23/28* (2006.01)
(52) U.S. Cl.
USPC ........................................................ 434/262
(58) Field of Classification Search
USPC ............ 434/262–275; 428/152, 164; 148/402
See application file for complete search history.

(56) References Cited

U.S. PATENT DOCUMENTS

| 4,932,879 A | 6/1990 | Ingenito et al. |
| 6,461,165 B1 | 10/2002 | Takashina et al. |
| 2008/0248247 A1 | 10/2008 | Caine |

FOREIGN PATENT DOCUMENTS

WO    WO-97/02553 A    1/1997

OTHER PUBLICATIONS

"International Search Report & Written Opinion for PCT/EP2010/067294 dated Jul. 18, 2011".
"Norwegian Search Report in 20093322 dated Jun. 10, 2010".

*Primary Examiner* — Timothy A Musselman
(74) *Attorney, Agent, or Firm* — Dorsey & Whitney LLP

(57) ABSTRACT

This invention relates to pulse simulation units for use in patient simulators, where the device comprises a base body, an upper actuator body located in parallel above the base body, one leaver body at each longitudinal end of the base body, which in their lower portion is pivotally attached to the base body and in their upper portion is pivotally attached to the actuator body, and at least one shape memory alloy wire attached in one end to the lower portion of each leaver body below the pivotally attachment to the base body and in the other end to the base body, and where the length of the shape memory alloy actuator wire is adjusted such that when no electric pulse is delivered, the length of the wire(s) allow the leaver bodies to be more or less folded in towards the base body and hold the actuator body to form a compressed position at a first distance above the base body, and such that when the actuator wire(s) contract due to exposure to an electric pulse they will rotate the lever bodies some degrees and thus cause the actuator body to be lifted to an expanded position at a second distance>the first distance above the base body.

14 Claims, 3 Drawing Sheets

PULSE SIMULATION UNIT

BACKGROUND

According to Asgaut Viste at Department of Surgical Studies at the University in Bergen, medical mistreatment causes more deaths than deaths from AIDS, traffic accidents, and breast cancer [1]. There are serious ethical aspects involved in making errors causing severe pain and/or losses for the patients and their relatives. Another aspect is that there are huge economical and capacity savings at hospitals/-medical institutions involved by preventing medical mistreatment from happening, as compared to costs associated with treating/alleviating the damage caused by erroneous medical treatment.

Training personnel to handle emergency situations have long been mandatory in safety critical applications such as aviation, shipping, process industry etc. by use of simulating potential accidents/incidents. The workplace environment in such places is often technologically complex and there may be short time margins between occurrence of an incident and the required correct response to avoid severe consequences. There are also typically considerable risks involved in misjudgements, placing a high stress on the operator(s) taking care of the incident. Simulation of potential incidents and drilling the employees to respond to them is known to be an effective tool for reducing the risks for making misjudgements and thus erroneous responses in such cases.

In health services, the use of patient simulators has been found effective in maintaining skills, training and education of personnel which is expected to encounter medical emergency situations and to practice life saving skills. A patient simulator is a realistic, interactive human resembling training manikin which may be given a range of clinical functionalities and which may respond to clinical intervention, instructor control and/or pre-programmed scenarios. Examples of clinical functionalities may be spontaneous breathing patterns with varying depths and rates, voice sounds, realistic normal and abnormal heart, breath and bowel sounds, cardiac rhythms with synchronized pulses, changeable anatomy to represent conditions such as tongue edema, pharyngeal swelling and laryngospasm, adjustable fontanel, blood pressure synchronized with cardiac rate rhythms, bleeding control modules etc.

Patient simulators should be made to feel and look as human as possible in order to provide simulations as realistic as possible of real life incidents. One aspect in providing this illusion of reality is to provide the patient simulator with a pulse beat that feels like the pulse beat of a live human. The pulse beat of the patient simulator should be able to mimic any normal and abnormal cardiac rhythm in order to possible medical conditions, and these different cardiac rhythms should feel similar on the skin of the patient simulator as they would do in a real human patient.

OBJECTIVE OF THE INVENTION

The main objective of this invention is to provide a pulse beat simulating unit for patient simulators, able to mimic any normal and abnormal cardiac rhythm in human patient simulators.

DESCRIPTION OF THE INVENTION

The invention is based on the realisation that a wire of shape memory alloy will contract when being exposed to an electrical current and return to its original length when the current is removed, and that it is possible to use the contraction behaviour of shape memory wires to mimic a pulse beat by employing the wires in a mechanical structure able to transform the contraction movement of the wires into an expansion force, and place the mechanical structure underneath the artificial skin of a patient simulator manikin. By controlling both the applied potential difference and duration of the electric pulses delivered to the wire of shape memory alloy, it becomes possible to mimic any normal and abnormal cardiac rhythm.

In a first aspect the invention relates to a pulse beat simulating device for use in patient simulators, wherein the device comprises:
  a base body,
  an upper actuator body located in parallel above the base body,
  one leaver body at each longitudinal end of the base body, which in their lower portion is pivotally attached to the base body and in their upper portion is pivotally attached to the actuator body, and
  at least one shape memory alloy wire attached in one end to the lower portion of each leaver body below the pivotally attachment to the base body and in the other end to the base body, and where the length of the shape memory alloy actuator wire is adjusted such that when no electric pulse is delivered, the length of the wire(s) allow the leaver bodies to be more or less folded in towards the base body and hold the actuator body to form a compressed position at a first distance above the base body, and such that when the actuator wire(s) contract due to exposure to an electric pulse they will rotate the lever bodies some degrees and thus cause the actuator body to be lifted to an expanded position at a second distance>the first distance above the base body.

An electric pulse at appropriate potential and duration will when delivered to the shape memory alloy actuator wire, heat the wire and thus cause the wire to contract. The reduced length of the wire will make the and thus drag the lower end of the leaver body in towards the base body. Then the leaver body will rotate some degrees over the rotation axis formed by the pivotal attachment to the base body, and this rotational movement will in turn push the actuator body away from the base body and bring it towards the upper expanded position.

By employing means for delivering controlled patterns of current pulses to the shape memory alloy wires controlling the movement of the leaver arms, with regulation of both applied potential difference and duration, the reciprocal movement of the actuator body may be made to mimic any normal and abnormal cardiac rhythm by placing the unit such that the actuator body exerts a pulsating force from below of the artificial skin of the patient simulator manikin.

The unit according to the first aspect of the invention has the advantage that it is of a simple mechanic construction allowing cost effective units with small physical dimensions and low power consumptions. This is i.e. advantageous for use in human patient simulator manikins of babies or infants, and is also advantageous in that the control signals (pulses) to the unit may be directly from the CPU of the manikin.

The working principle of the unit according to the first aspect of the invention is schematically shown in FIG. 1. The figure shows the unit from the side and in the compressed position. A base body 1 made of a rigid material is equipped with one lever body 2 on each side, the lever bodies 2 are pivotally attached to base boy 1 at point 4. Each lever body 2 is also connected to the base body 1 by a wire 6 of shape memory alloy. On top of both lever arms, there is attached an actuator body 3 by use of two pivotal attachments 5. When an electric pulse is delivered to the shape memory alloy 6, it will contract and thus drag the lower end of the leaver body 2 in towards the base body 1 and thus force the leaver body 2 to rotate some degrees over the rotation axis formed by the pivotal attachment 4 to the base body. This rotational movement will in turn push the actuator body 3 away from the base body and bring it towards an upper expanded position at a second distance>first distance above the base body 1. By employing means (not shown on the Figure) for delivering controlled patterns of current pulses to the shape memory alloy wires 6 controlling the movement of the leaver bodies 2, with regulation of both applied potential difference and duration, the reciprocal movement of the actuator body 3 may be made to mimic any normal and abnormal cardiac rhythm by placing the unit such that the actuator body 3 exerts a pulsating force from below of the artificial skin of the patient simulator manikin.

The pulse beat simulating unit may preferably be placed in an upright position in a cavity just below the artificial skin of the patient simulator, that is, the pulse beat simulating unit is placed in the cavity such that the base body rests on the bottom of the cavity while the actuator body 3 is in contact with underside of the artificial skin of the patient simulator manikin when in the compressed position. Then it will be possible to feel a pulse beat resembling movement of the artificial skin when the unit is activated such that the actuator body 3 is raised to the upper expanded position.

The invention may employ any material of the support structure (base body 2, lever bodies 2, and actuator body 3) with a sufficient rigidity to allow a exerting a pulse beat resembling force to the artificial skin of the simulator manikin, i.e. including various polymeric materials, metals, etc. Examples of suited materials includes polymeric materials made of one of polyoxymethylene, polyacetol, nylon (PA 6 or PA 6.6), polypropylene, polyolefins.

The invention may employ any shape memory alloy wire able to contract up to a few percent when exposed to electric currents. Example of a suited wire is nickel-titanium actuator wires which will contract from 2 to 5% of their length when exposed to an electric current heating the wire from room temperature up to 70-90° C. The wire is commercially available from i.e. Dynalloy Inc. 14762 Bentley Circle Tustin, Calif. 92780, USA, with diameters ranging from 0.025 mm up to 0.508 mm and which may exert a maximum pulling force from 7 to 3562 g, respectively. A wire with diameter 0.076 mm has been tested and found suited for the present invention, but other diameters may also be employed.

LIST OF FIGURES

EXAMPLE EMBODIMENT OF THE INVENTION

Figure 1:
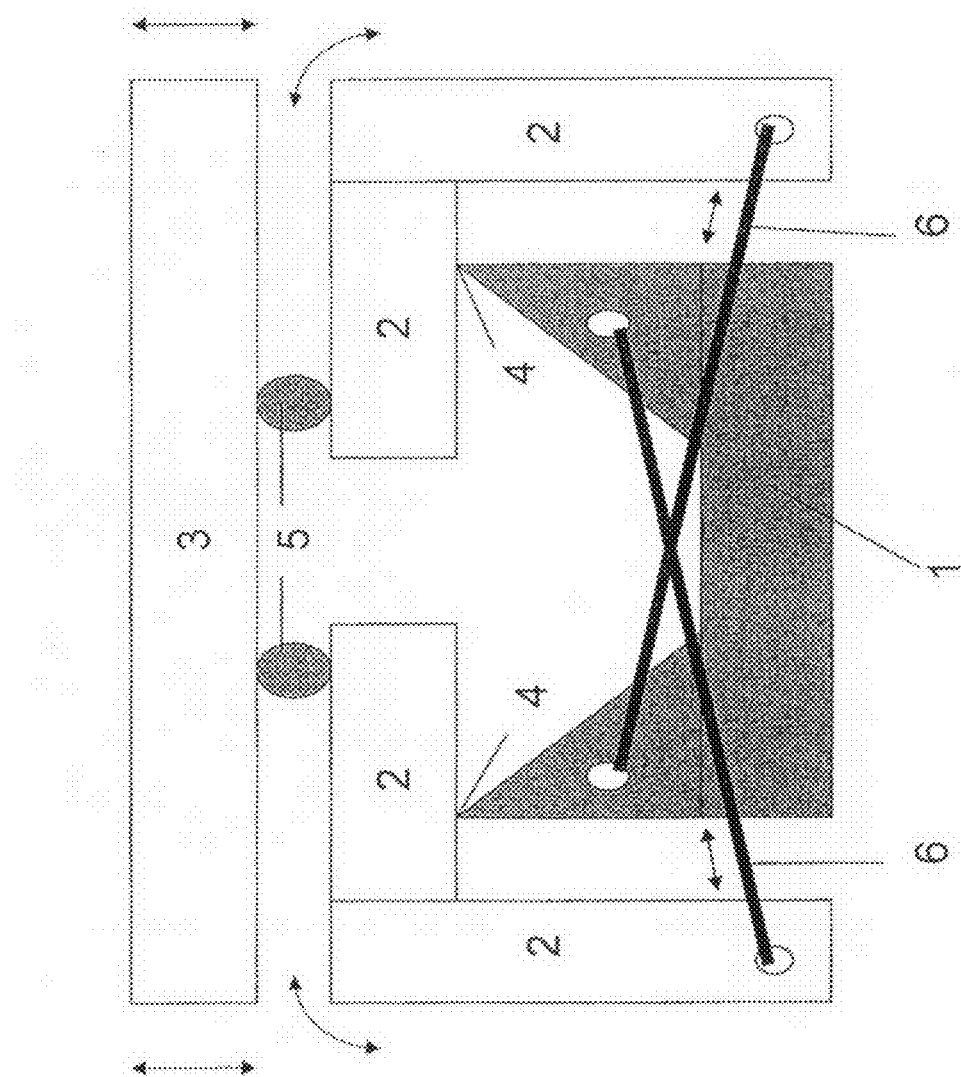
FIG. 1 is a schematic drawing seen from the side of the device according to the first aspect of the invention.
Figure 2:
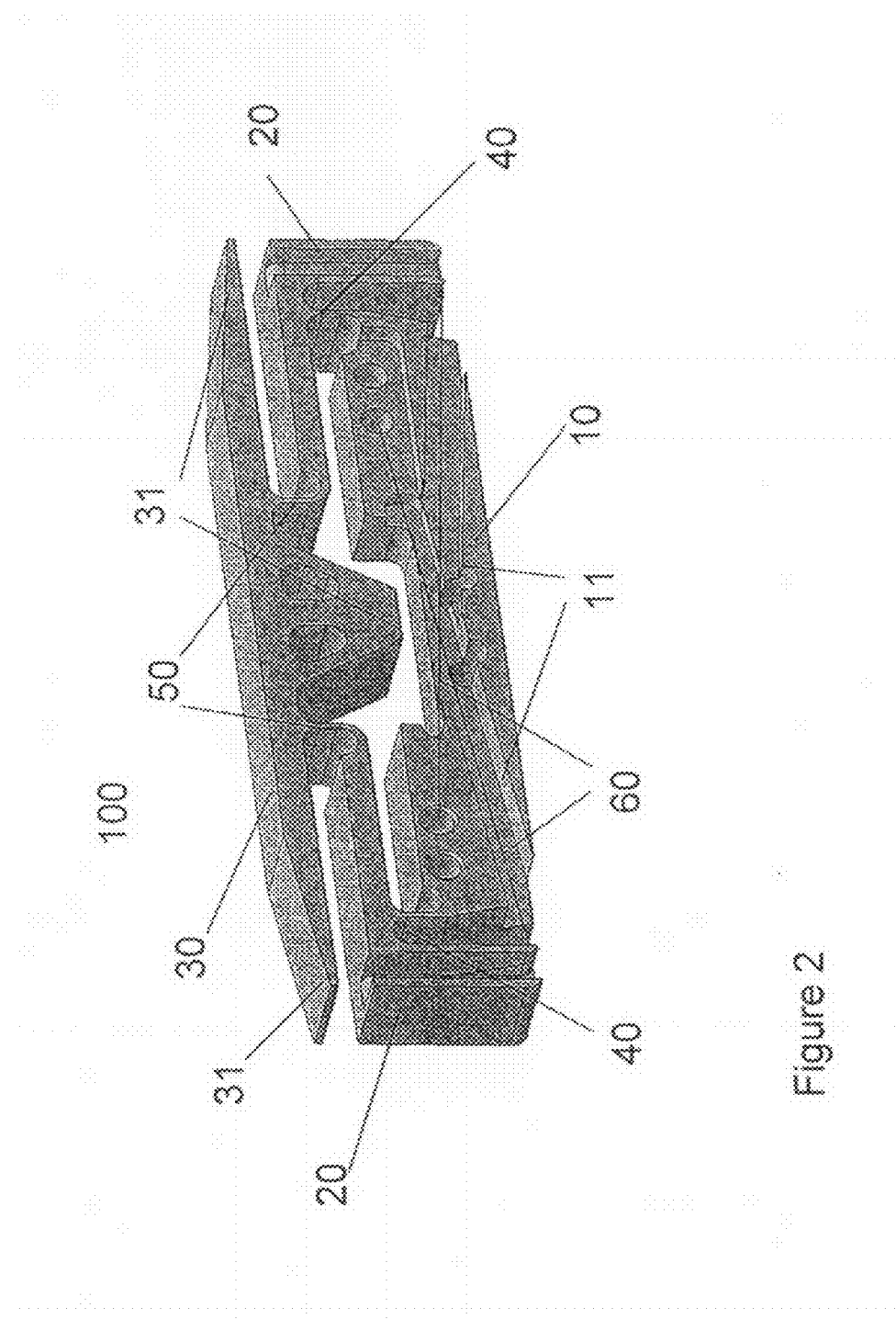
FIG. 2 is a drawing of an example embodiment of the invention.

The invention will be described in further detail by way of an example embodiment shown from the side and somewhat from above in FIG. 2.

The example embodiment 100 is made of two parts, a plastic structure and two shape memory alloy actuator wires 60. The plastic structure has an overall shape of a rectangular parallelepiped with dimensions 30×5×8 mm$^3$, and is composed of one piece consisting of a base body 10 pivotally connected to two lever bodies 20 by narrow bridging sections 40, and each lever body is pivotally connected to an actuator body 30 by narrow bridging sections 50. That is the base body, lever bodies and actuator body is made out of one piece of plastic to form a continuous interconnected structure which is able to transform the contraction of the actuator wires into an expansion movement of the actuator body. The plastic structure may be formed by compression moulding, injection moulding etc., and is made of polyoxymethylene.

The narrow bridging sections (40, 50) are areas of the plastic structure which is sufficiently thin to be flexible such that they will bend when subject to mechanical force induced by the contracting actuator wires etc. The thickness should be in the area from 0.1 to 1.0 mm. The thickness of the narrow bridging sections in the example embodiment is 0.15 mm.

The plastic structure may be equipped with grooves 11 to house and protect the actuator wires 60 from compression forces induced by persons employing the patient simulator manikin for practicing life saving techniques etc. The plastic structure may advantageously also be equipped with end stopping regions (31) to prevent the plastic structure to be compressed to a state where the actuator wires 60 becomes stretched to their snapping/breaking point.

The shape memory alloy actuator wire is a nickel-titanium wire of 0.076 mm, and is actuated by pulses of electric power ranging from a potential of one of 5, 6, 7, 8, 9, 10, 11, and 12 V for a period of one of 5, 6, 7, 8, 9, 10, 11, 12, 13, 14, 15, 16, 17, 18, 19, 20, 21, 22, 23, 24, 25, 26, 27, 28, 29 and 30 ms. With this wire, a potential of 9 V will give a current of 600 mA and the pulse may advantageously last for 20 ms, while a potential of 12 V will give a current of 800 mA and the pulse may advantageously last for 15 ms. Other combinations may also be applied, depending on the intended characteristic of the cardiac rhythm being simulated. The energy consumption of the unit with two such wires is typically around 0.5 W at 100 pulses per minute.

Figure 3:
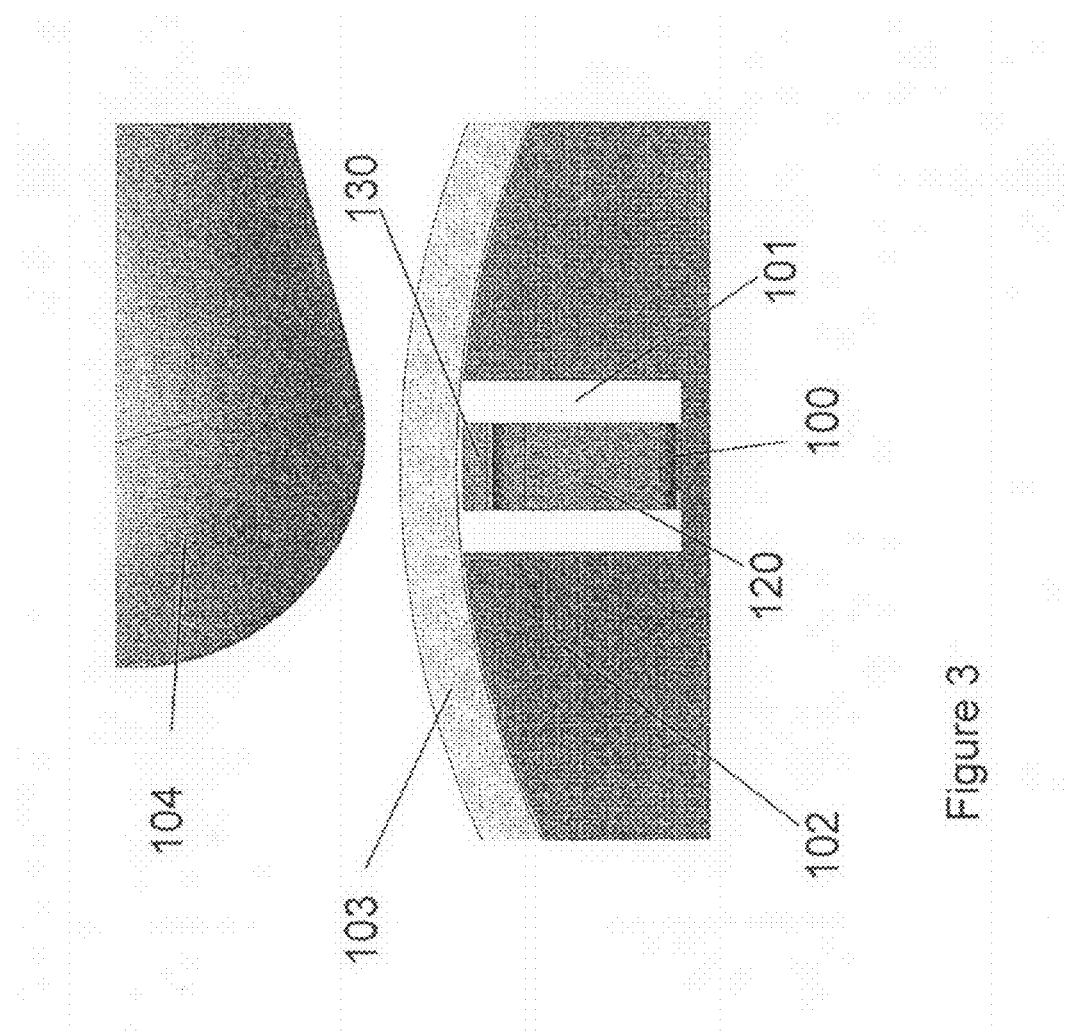
FIG. 3 is a schematic drawing showing a possible placement of the example embodiment of the invention in a patient simulator manikin.

FIG. 3 illustrates a possible configuration of the example embodiment 100 placed in a cavity 101 inside the artificial skin 103 of a patient simulator manikin 102 (the figure shows only a small part of the manikin). The device 100 is seen from the side approximately perpendicular to the view of FIG. 2, such that the figure shows one leaver body 120 and the end portion of the actuator body 130. The device is in the compressed state with the actuator body 130 in a first distance above the base body (not shown). When an electric pulse is delivered to the actuator wires, they will contract and this movement is transformed to an outwardly directed movement of the actuator body 130 such that it pushes on the skin 103 from below. This movement will be noticed and feels like a pulse beat by a human finger 104 of the person practicing on the patient simulator manikin 102.

REFERENCES 1 https://bora.uib.no/bitstream/ 1956/1088/1/Asgaut% 20Viste% 201.pdf

The invention claimed is:

1. A pulse beat simulating device for use in patient simulators, wherein the device comprises:
   a base body,
   an actuator body located at a first distance relative to the base body,
   a pair of leaver bodies, one leaver body disposed at each longitudinal end of the base body, wherein respective lower portions of each of the leaver bodies are pivotally attached to the base body and wherein respective upper portions of each of the leaver bodies are pivotally attached to the actuator body, and at least one shape memory alloy wire attached to the lower portion of each leaver body and to the base body, the wire being configured, when exposed to electric current, to contract and move the lower portions of the leaver bodies towards the base body causing the actuator body to displace to a second distance relative to the base body, the second distance being greater than the first distance.

2. The device according to claim 1, wherein the base body, the lever bodies, and the actuator body are connected to each other by bridging sections to form a continuous interconnected structure.

3. The device according to claim 2, wherein at least one of the bridging sections has a thickness in the range from 0.1 to 1.0 mm.

4. The device according to claim 2, wherein the continuous interconnected structure is made of plastic.

5. The device according to claim 2, wherein the continuous interconnected structure is made of polyoxymethylene, polyacetol, nylon (PA 6 or PA 6.6), polypropylene, polyolefins, or combinations thereof.

6. The device according to claim 2, wherein the continuous interconnected structure has an overall shape of a rectangular parallelepiped with dimensions 30×8×5 mm$^3$.

7. The device according to claim 3, wherein at least one of the bridging sections has a thickness of 0.15 mm.

8. The device according to claim 3, wherein the continuous interconnected structure is made of plastic.

9. The device according to claim 7, wherein the continuous interconnected structure is made of plastic.

10. The device according to claim 1, wherein the base body includes grooves configured to house the at least one shape memory alloy wire.

11. The device according to claim 1, wherein the at least one shape memory wire is made of nickel titanium with a diameter ranging from 0.025 to 0.508 mm.

12. The device according to claim 1, wherein the at least one shape memory wire has a diameter of 0.076 mm.

13. The device according to claim 1, configured to be actuated by applying an electric potential of 5, 6, 7, 8, 9, 10, 11, or 12 V to the at least one shape memory wire for a period of 5, 6, 7, 8, 9, 10, 11, 12, 13, 14, 15, 16, 17, 18, 19, 20, 21, 22, 23, 24, 25, 26, 27, 28, 29 or 30 ms.

14. The device according to claim 1, wherein the at least one wire has a first length when electrical current is applied to the wire, the wire further having a second length when no current is applied to the wire, and wherein the leaver bodies are configured to rotate in a first direction when the wire is at the first length to cause the actuator body to displace relative to the base body, the leaver bodies being further configured to rotate in the opposite direction when the wire is at the second length.

* * * * *